United States Patent
Jung et al.

(10) Patent No.: US 10,094,926 B2
(45) Date of Patent: Oct. 9, 2018

(54) DEVICE FOR EXTRACTING DEPTH INFORMATION

(71) Applicant: LG INNOTEK CO., LTD., Seoul (KR)

(72) Inventors: Sung Ki Jung, Seoul (KR); Gi Seok Lee, Seoul (KR); Kyung Ha Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/115,227

(22) PCT Filed: Jan. 28, 2015

(86) PCT No.: PCT/KR2015/000914
§ 371 (c)(1),
(2) Date: Jul. 28, 2016

(87) PCT Pub. No.: WO2015/115800
PCT Pub. Date: Aug. 6, 2015

(65) Prior Publication Data
US 2016/0377720 A1  Dec. 29, 2016

(30) Foreign Application Priority Data

Jan. 29, 2014 (KR) .................. 10-2014-0011787

(51) Int. Cl.
*G01S 17/10* (2006.01)
*G01S 7/48* (2006.01)
(Continued)

(52) U.S. Cl.
CPC ............ *G01S 17/10* (2013.01); *G01S 7/4817* (2013.01); *G01S 7/4865* (2013.01); *G01S 17/42* (2013.01); *G01S 17/89* (2013.01)

(58) Field of Classification Search
CPC .......... G01S 17/89; G01S 17/08; G01S 17/10; G01S 17/4817; G01S 17/4865; G01S 17/42
(Continued)

(56) References Cited

U.S. PATENT DOCUMENTS 4,484,075 A * 11/1984 Kahl, Jr. ............... G08B 13/193
250/336.2
5,836,205 A * 11/1998 Meyer .................... F16H 19/04
74/422
(Continued)

FOREIGN PATENT DOCUMENTS

KR  10-2010-0081197 A   7/2010
KR  10-2010-0122988 A   11/2010
(Continued)

*Primary Examiner* — David Porta
*Assistant Examiner* — Blake Riddick
(74) *Attorney, Agent, or Firm* — Birch, Stewart, Kolasch & Birch, LLP (57) ABSTRACT

A device for extracting depth information, according to one embodiment of the present invention, comprises: a light output unit for outputting infrared (IR) light; a light adjustment unit for adjusting an angle of the light outputted from the light output unit such that the light scans a first region including an object, and then adjusting the angle of the light such that the light scans a second region, which is a portion of the first region; a light input unit in which the light outputted from the light output unit and reflected from the object is inputted; and a control unit for extracting depth information of the second region by using the flight time taken up until the light outputted from the light output unit is inputted into the light input unit after being scanned to and reflected from the second region.

12 Claims, 6 Drawing Sheets

(51) Int. Cl.
  *G01S 17/42*     (2006.01)
  *G01S 17/89*     (2006.01)
  *G01S 7/481*     (2006.01)
  *G01S 7/486*     (2006.01)

(58) Field of Classification Search
  USPC .......................................... 250/338.1, 341.8
  See application file for complete search history.

(56) References Cited

U.S. PATENT DOCUMENTS

| | | | | |
|---|---|---|---|---|
| 7,209,221 | B2* | 4/2007 | Breed | B60N 2/002 |
| | | | | 356/28 |
| 7,560,679 | B1* | 7/2009 | Gutierrez | G01C 3/08 |
| | | | | 250/208.1 |
| 7,697,834 | B1* | 4/2010 | Tsai | G02B 7/38 |
| | | | | 250/201.2 |
| 7,852,462 | B2* | 12/2010 | Breed | B60Q 9/008 |
| | | | | 356/28 |
| 8,379,930 | B2* | 2/2013 | Chang | G01S 17/08 |
| | | | | 382/106 |
| 2002/0181836 | A1* | 12/2002 | Lemoff | G02B 6/32 |
| | | | | 385/16 |
| 2006/0055811 | A1* | 3/2006 | Frtiz | G02B 26/06 |
| | | | | 348/340 |
| 2008/0099689 | A1* | 5/2008 | Nygard | G01T 1/2018 |
| | | | | 250/370.09 |
| 2010/0188558 | A1* | 7/2010 | Gamadia | H04N 5/23212 |
| | | | | 348/345 |
| 2010/0290674 | A1 | 11/2010 | Kim | |
| 2012/0154537 | A1* | 6/2012 | Chang | H04N 5/2256 |
| | | | | 348/46 |
| 2012/0169848 | A1* | 7/2012 | Bae | G01S 7/4861 |
| | | | | 348/46 |
| 2012/0300038 | A1* | 11/2012 | You | G02F 1/017 |
| | | | | 348/47 |
| 2013/0050426 | A1* | 2/2013 | Sarmast | G01S 17/89 |
| | | | | 348/46 |
| 2013/0053101 | A1* | 2/2013 | Tsai | H04N 5/2258 |
| | | | | 455/556.1 |
| 2013/0101176 | A1 | 4/2013 | Park et al. | |
| 2013/0222543 | A1 | 8/2013 | Bae et al. | |
| 2013/0293764 | A1* | 11/2013 | Lipson | H04N 5/2257 |
| | | | | 348/345 |
| 2013/0293765 | A1* | 11/2013 | Lipson | G03B 3/10 |
| | | | | 348/345 |
| 2013/0321584 | A1* | 12/2013 | Choi | G01S 17/89 |
| | | | | 348/46 |
| 2013/0329106 | A1* | 12/2013 | Bigioi | G03B 3/10 |
| | | | | 348/308 |
| 2014/0119603 | A1* | 5/2014 | Jin | G06T 7/254 |
| | | | | 382/103 |
| 2014/0285686 | A1* | 9/2014 | Cho | G06K 9/2063 |
| | | | | 348/231.99 |
| 2015/0138325 | A1* | 5/2015 | Seo | G02B 26/0833 |
| | | | | 348/49 |

FOREIGN PATENT DOCUMENTS

| | | |
|---|---|---|
| KR | 10-2011-0021500 A | 3/2011 |
| KR | 10-2013-0045018 A | 5/2013 |
| KR | 10-2013-0098042 A | 9/2013 |

* cited by examiner

DEVICE FOR EXTRACTING DEPTH INFORMATION

CROSS REFERENCE TO RELATED APPLICATIONS

This application is the National Phase of PCT International Application No. PCT/KR2015/000914, filed on Jan. 28, 2015, which claims priority under 35 U.S.C. 119(a) to Patent Application No. 10-2014-0011787, filed in the Republic of Korea on Jan. 29, 2014, all of which are hereby expressly incorporated by reference into the present application.

TECHNICAL FIELD

The present disclosure relates to extracting depth information, and more particularly, to a device for extracting depth information using a time-of-flight (TOF) method.

BACKGROUND ART

A technology of acquiring a three-dimensional image using a capturing device is advancing. Depth information (depth map) is required for acquiring a three-dimensional image. Depth information is information that indicates a spatial distance and shows perspective information of a point with respect to another point in a two-dimensional image.

A method in which infrared (IR) structured light is projected to an object and light reflected from the object is interpreted to extract depth information is one of the methods of acquiring depth information. According to the method using IR structured light, there is a problem in that it is difficult to obtain a desired level of depth resolution for a moving object.

Meanwhile, a time-of-flight (TOF) method is gaining attention as a substitute technology for the method using IR structured light. According to the TOF method, a distance from an object is calculated by measuring a flight time, i.e., a time taken for emitted light to be reflected.

Generally, a camera according to the TOF method scans a front surface of an object with light and recognizes a motion of an area of interest within the object. In this case, when the size of the area of interest is smaller than that of the front surface of the object or the area of interest is far away from the camera, there is a problem in that the resolution of the area of interest decreases.

DISCLOSURE

Technical Problem

The present disclosure is directed to providing a device and method for extracting depth information in which a TOF method is used to extract depth information.

Technical Solution

According to an embodiment of the present disclosure, a device for extracting depth information includes a light output unit that outputs infrared (IR) light, a light adjustment unit that adjusts the angle of the light output from the light output unit such that the light scans a first region including an object and then adjusts the angle of the light such that the light scans a second region, which is a portion of the first region, a light input unit into which the light output from the light output unit and reflected from the object is input, and a control unit that extracts depth information of the second region using the flight time of the light that is output from the light output unit, scans, is reflected from the second region, and is input into the light input unit.

The first region may be the entire region including the object, and the second region may be extracted from the first region and may be a partial region including a predetermined region of the object.

The light adjustment unit may be set to scan the second region for the same amount of time as the amount of time taken to scan the first region.

The light adjustment unit may include a microelectromechanical system (MEMS) actuator that adjusts the angle of light, and an operating cycle of the MEMS actuator for scanning the second region may be set to be the same as an operating cycle of the MEMS actuator for scanning the first region.

The light adjustment unit may include a MEMS actuator that adjusts the angle of light, and an operating cycle of the MEMS actuator for scanning the second region may be set to be shorter than an operating cycle of the MEMS actuator for scanning the first region.

The light adjustment unit may be set to scan the second region for a shorter amount of time than an amount of time taken to scan the first region.

The light input unit may include a plurality of pixels each including a first reception unit and a second reception unit, and the control unit may calculate the flight time using a difference between amounts of light input into the first reception unit and the second reception unit.

The first reception unit may be activated while a light source is turned on, and the second reception unit may be activated while the light source is turned off.

The control unit may include a timing control unit that controls a time point of at least one of the light output unit, the light adjustment unit, and the light input unit, a conversion unit that converts an electrical signal input through the light input unit into a digital signal, and a signal processing unit that extracts depth information of the second region.

According to an embodiment of the present disclosure, a method for extracting depth information of a device for extracting depth information includes scanning a first region including an object with infrared (IR) light output from a light output unit, being input with light that scans and is reflected from the first region, scanning a second region, which is a portion of the first region, with IR light output from the light output unit to, being input with light that scans and is reflected from the second region, and extracting depth information of the second region using the flight time of the light that is output from the light output unit, scans, is reflected from the second region, and is into the light input unit.

The second region may be extracted from the first region using the light that scans and is reflected from the first region.

Advantageous Effects

According to an embodiment of the present disclosure, a device for extracting depth information with a small number of operations and excellent depth resolution can be obtained. Accordingly, electricity consumed by the device for extracting depth information can be reduced, and a distance from an object can be precisely extracted.

MODES OF THE INVENTION

Since various modifications may be made to the present disclosure and the present disclosure may have various embodiments, particular embodiments are illustrated in the drawings and described. However, this is not for limiting the present disclosure to the particular embodiments, and all modifications, equivalents, and substitutes included within the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, the first element may also be referred to as the second element. The term and/or includes a combination of a plurality of related described items or any one item among the plurality of related described items.

When it is mentioned that a certain element is "connected" or "linked" to another element, although the certain element may be directly connected or linked to the another element, it should be understood that another element may exist therebetween. On the other hand, when it is mentioned that a certain element is "directly connected" or "directly linked" to another element, it should be understood that another element does not exist therebetween.

Terms used in the application are merely used for describing particular embodiments and are not intended to limit the present disclosure. A singular expression includes a plural expression unless clearly meaning otherwise in terms of context. In the application, terms such as "include" or "have" are for designating that features, number, steps, operations, elements, parts, or combinations thereof exist and should not be construed as precluding existence of or possibilities of adding one or more other features, numbers, steps, operations, elements, parts or combinations thereof in advance.

Unless otherwise defined, all terms, including technical or scientific terms, used herein have the same meaning as commonly understood by one of ordinary skill in the art to which the disclosure pertains. Terms, such as those defined in commonly used dictionaries, should be construed as having a meaning that is consistent with their meaning in the context of the relevant art and will not be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

Figure 1:
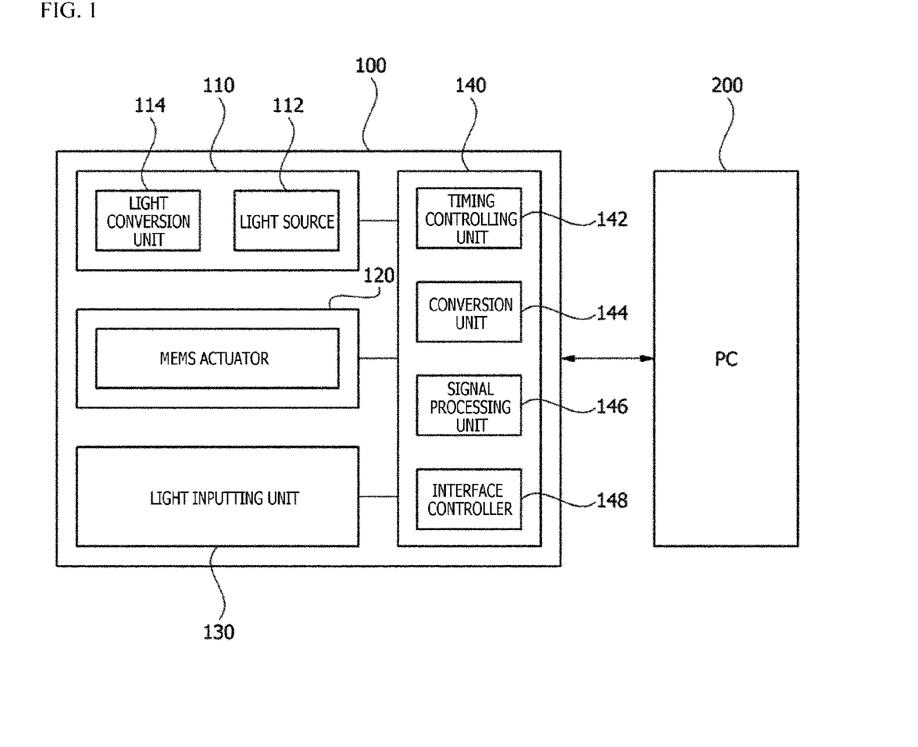
FIG. 1 is a block diagram of a depth information extraction system according to an embodiment of the present disclosure.
Figure 2:
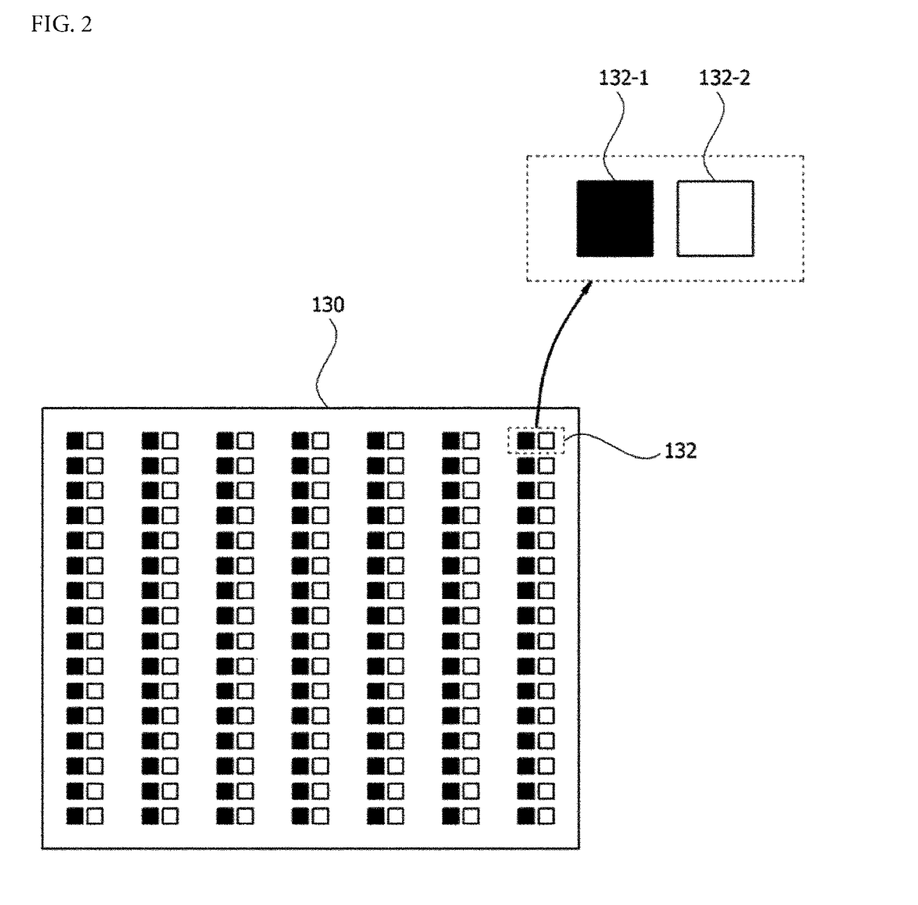
FIG. 2 illustrates a structure of a light input unit of a depth information extracting device according to an embodiment of the present disclosure.
Figure 3:
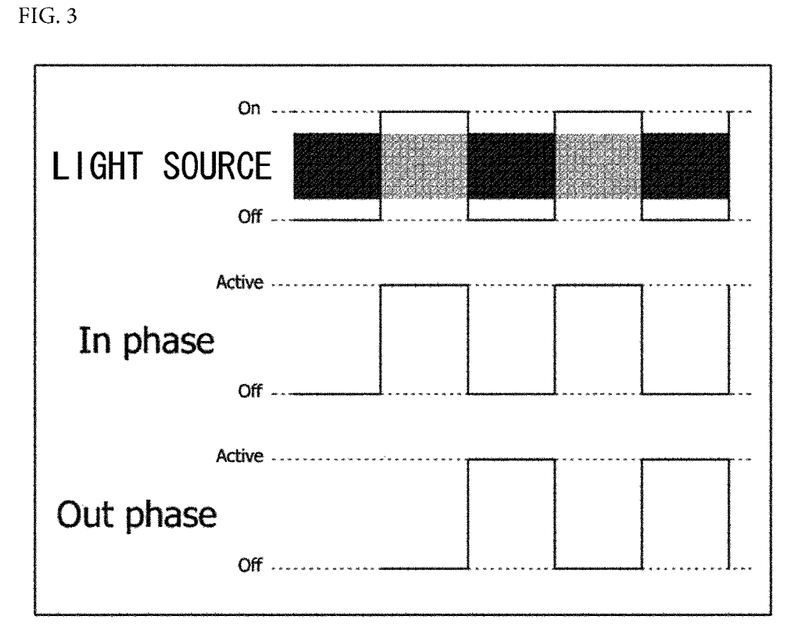
FIG. 3 illustrates the principle of extracting depth information of a depth information extracting device according to an embodiment of the present disclosure.

FIG. 1 is a block diagram of a depth information extraction system according to an embodiment of the present disclosure, FIG. 2 illustrates a structure of a light input unit of a depth information extracting device according to an embodiment of the present disclosure, and FIG. 3 illustrates a principle of extracting depth information of a depth information extracting device according to an embodiment of the present disclosure.

Referring to FIG. 1, a depth information extraction system includes a depth information extracting device 100 and a computing device 200. Here, the computing device 200 refers to a device including a function of middleware and may be a personal computer (PC), a laptop computer, a tablet PC, a smartphone, etc.

The depth information extracting device 100 includes a light output unit 110, a light adjustment unit 120, a light input unit 130, and a control unit 140.

The light output unit 110 outputs infrared (IR) light. The IR light may be, for example, light having a wavelength band that is 800 nm or higher. The light output unit 110 includes a light source 112 and a light conversion unit 114. The light source may include at least one laser diode (LD) or light emitting diode (LED) that projects infrared rays. Also, the light conversion unit 114 may modulate light output from the light source 112. The light conversion unit 114 may, for example, perform pulse modulation or phase modulation of the light output from the light source 112. Accordingly, the light output unit 110 may output light while causing the light source to flicker at every predetermined interval.

The light adjustment unit 120 adjusts the angle of light so that the light scans a region including an object. For this, the light adjustment unit 120 may include a microelectromechanical system (MEMS) actuator. MEMS refers to a system in which a mechanical structure at a micro level and an electronic circuit are integrated. According to an embodiment of the present disclosure, the MEMS actuator may use an electrical signal to finely adjust the angle of light for scanning an object. For example, the MEMS actuator may rotate a reflection member that adjusts the optical path to scan an object with light.

Figure 4:
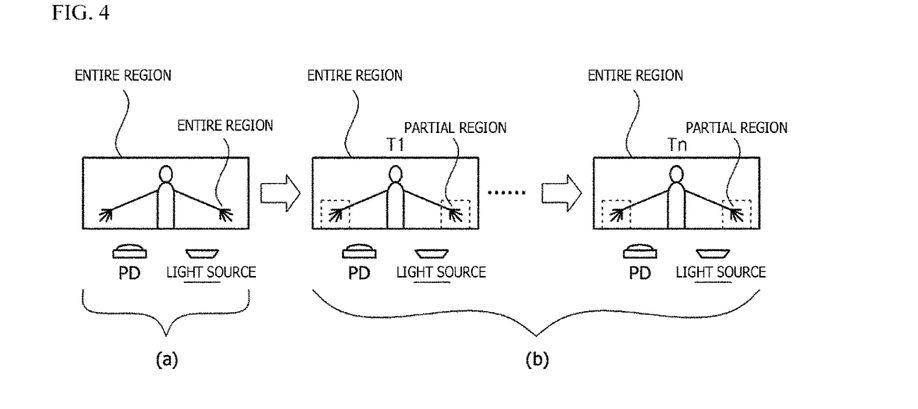
FIG. 4 illustrates an example of scanning an entire region and a partial region by a depth information extracting device according to an embodiment of the present disclosure.

The light adjustment unit 120 may adjust the angle of light so that light scans the entire region including an object. For example, as in FIG. 4(A), the light adjustment unit 120 may adjust the angle of light so that the light scans an entire region including a person. Accordingly, light output from the light output unit 110 may scan the entire region in units of pixels or lines. Also, the light adjustment unit 120 may also adjust the angle of light so that the light scans a partial region which is a portion of the entire region. For example, as illustrated in FIG. 4(B), the light adjustment unit 120 may adjust the angle of light so that the light scans a partial region including hands of the entire region. Accordingly, the light output from the light output unit 110 may scan only a partial region in units of pixels or lines.

When scanning at a speed of 30 frames per second, it may be set so that an entire region is scanned in a first frame, and a partial region is scanned in remaining frames. For this, the computing device 200 connected to the depth information extracting device 100 may extract a partial region from an entire region. Meanwhile, the light input unit 130 is input with light that is output from the light output unit 110 and reflected by an object. The light input unit 130 may convert the input light into an electrical signal. The light input unit 130 may be an image sensor including a photo diode (PD) or a complementary metal-oxide semiconductor (CMOS). As in FIG. 2, the light input unit 130 may include a plurality of pixels 132 arranged. Each pixel may include an in-phase reception unit 132-1 and an out-phase reception unit 132-2.

The control unit 140 controls an overall operation of the depth information extracting device 100 and extracts depth information. The control unit 140 may be implemented with a controller chip. The control unit 140 may include a timing control unit 142, a conversion unit 144, a signal processing unit 146, and an interface controller 148. The timing control unit 142 controls time points of the light output unit 110, the light adjustment unit 120, and the light input unit 130. For example, the timing control unit 142 may control the flickering cycle of the light output unit 110, the operating cycle of the MEMS actuator included in the light adjustment unit 120, etc. The conversion unit 144 may convert an electrical signal input through the light input unit 130 into a digital signal.

In addition, the signal processing unit 146 extracts depth information of a partial region using a flight time of light that is output from the light output unit 110, scans, is reflected from the partial region, and is input into the light input unit 130. Here, the flight time of the light may be calculated using a difference between amounts of light input into the in-phase reception unit 132-1 and the out-phase reception unit 132-2. That is, as in FIG. 3, the in-phase reception unit 132-1 may be activated while a light source is turned on, and the out-phase reception unit 132-2 may be activated while the light source is turned off. In this way, when the in-phase reception unit 132-1 and the out-phase reception unit 132-2 are activated with a time difference, a difference occurs in the flight time of light, i.e., an amount of light received according to a distance from an object. For example, when the object is right in front of the depth information extracting device (i.e., when distance =0), a time taken for light output from the light output unit 110 to be reflected is 0 such that a flickering cycle of a light source becomes a light reception cycle without change.

Accordingly, only the in-phase reception unit 132-1 receives light, and the out-phase reception unit 132-2 does not receive light. In another example, when the object is spaced a predetermined distance away from the depth information extracting device, a time is taken for light output from the light output unit 110 to be reflected such that the flickering cycle of the light source is different from the light reception cycle.

Accordingly, a difference occurs between amounts of light received by the in-phase reception unit 132-1 and the out-phase reception unit 132-2.

Figure 5:
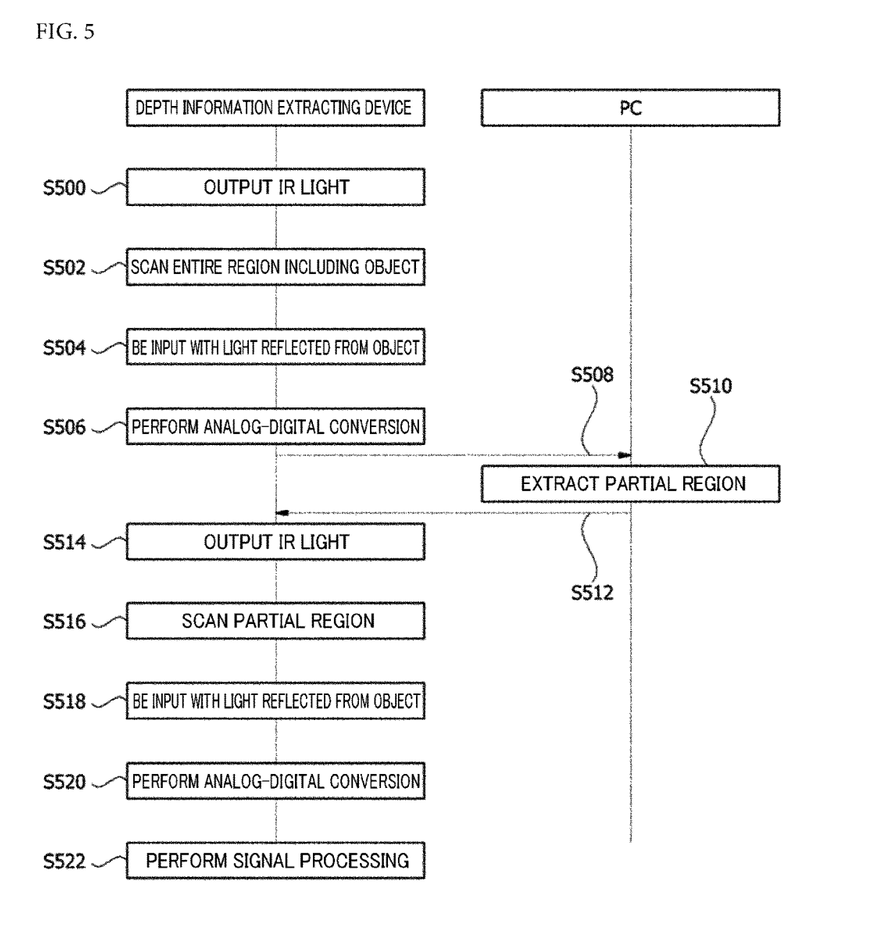
FIG. 5 is a flow chart illustrating a depth information extracting method of a depth information extracting device according to an embodiment of the present disclosure.

The interface controller 148 controls an interface with middleware such as a PC 200. For example, the interface controller 148 may transmit information on light input through the light input unit 130 after scanning an entire region to middleware such as the PC 200. Also, the interface controller 148 may receive information on a partial region extracted by middleware such as the PC 200 from the middleware such as the PC 200 and then transmit the information to the light adjustment unit 120 and the like. FIG. 5 is a flow chart illustrating a depth information extracting method of a depth information extracting device according to an embodiment of the present disclosure. Descriptions of contents overlapping with those of FIGS. 1 to 3 will be omitted.

Referring to FIG. 5, the light output unit 110 of the depth information extracting device 100 outputs IR light (S500), and the output light scans the entire region including an object by adjustment by the light adjustment unit 120 (S502).

In addition, light reflected from the object is input through the light input unit 130 (S504), and the control unit 140 converts an analog signal received from the light input unit 130 into a digital signal (S506) and then transmits the digital signal to the PC 200, for example (S508).

The PC 200 uses the signal received from the depth information extracting device 100 and extracts a partial region of the entire region (S510). The partial region may be a region including an interest target required for implementing an application. For example, when the application is changing a television (TV) channel according to a gesture of a finger, the partial region may include only fingers when the entire region includes a whole body of a person.

The PC 200 transmits information on the extracted partial region to the depth information extracting device 100 (S512). Meanwhile, the light output unit 110 of the depth information extracting device 100 outputs IR light (S514), and the output light scans only the partial region extracted from the entire region by adjustment by the light adjustment unit 120 (S516).

In addition, light reflected from the object is input through the light input unit 130 (S518), the control unit 140 converts the analog signal received from the light input unit 130 into a digital signal (S520), and signal processing is performed to extract depth information of the partial region (S522).

According to an embodiment of the present disclosure, the depth information extracting device 100 may scan a partial region several times during the time over which an entire region can be scanned once. Alternatively, the depth information extracting device 100 may scan the partial region more precisely once during the time over which the entire region can be scanned once.

Figure 6:
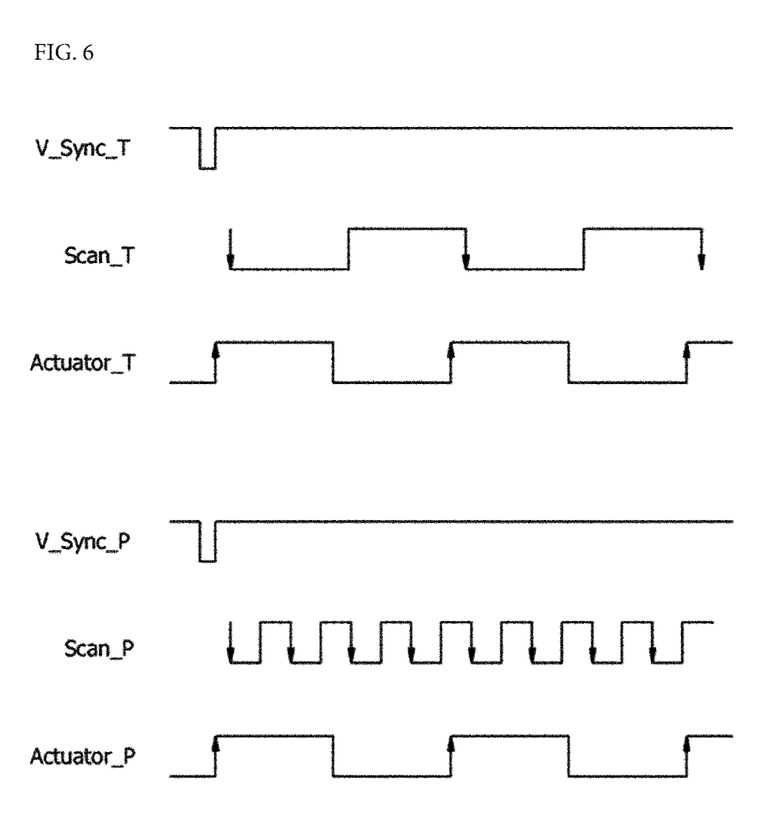
FIGS. 6 to 8 illustrate examples of timing diagrams for a light adjustment unit of a depth information extracting device according to an embodiment.
Figure 7:
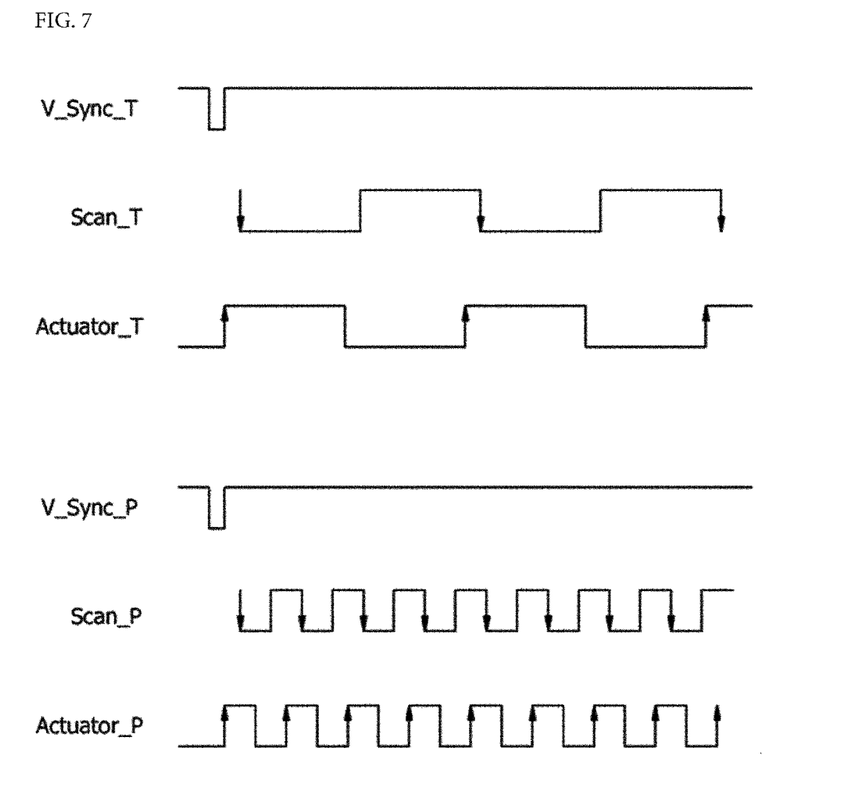
Figure 8:
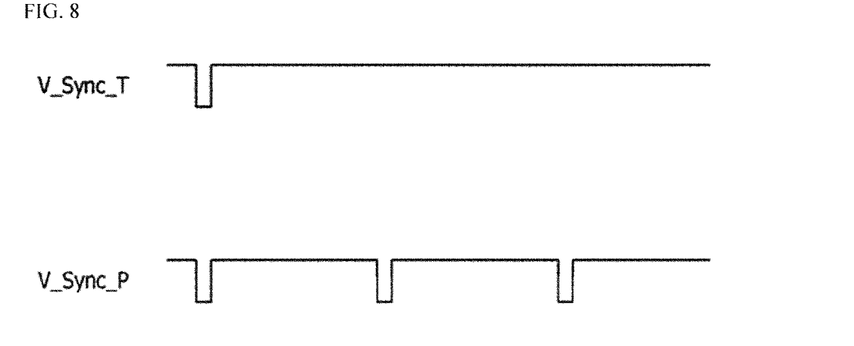

FIGS. 6 to 8 illustrate examples of timing diagrams for a light adjustment unit of a depth information extracting device according to an embodiment of the present disclosure. V_Sync_T is a timing diagram for scanning an entire region, and V_Sync_P is a timing diagram for scanning a partial region. Also, Scan_T is a timing diagram of output light scanning the entire region, Scan_P is a timing diagram of the output light scanning the partial region, and the output light may perform scanning at every falling edge. In addition, Actuator_T is a timing diagram of the MEMS actuator moving to scan the entire region, A_P is a timing diagram of the MEMS actuator moving to scan the partial region, and the MEMS actuator may move at every rising edge.

Referring to FIG. 6, the time taken to scan all pixels or all lines of the entire region and the time taken to scan all pixels or all lines of the partial region are the same. Also, a cycle in which the MEMS actuator moves to scan the entire region is the same as a cycle in which the MEMS actuator moves to scan the partial region. Accordingly, pixels or lines included in the partial region may be scanned for a larger number of times compared to a case of scanning the entire region.

Referring to FIG. 7, the time taken to scan all pixels or all lines of the entire region and the time taken to scan all pixels or all lines of the partial region are the same. Also, the MEMS actuator may be more finely adjusted when scanning the partial region compared to when scanning the entire region. Accordingly, the pixels or the lines included in the partial region may be more precisely scanned compared to when scanning the entire region.

Referring to FIG. 8, the time taken to scan all pixels or all lines of the partial region is shorter than the time taken to scan all pixels or all lines of the entire region. Accordingly, scanning may be performed a larger number of times over the same time when scanning the partial region compared to when scanning the entire region. For example, a device capable of scanning the entire region at a speed of 30 frames per second may be set to scan the partial region at a speed of 60 frames per second.

In this way, according to an embodiment of the present disclosure, a number of operations can be reduced when only the partial region including an interest target is scanned compared to when scanning the entire region. In addition, depth resolution can be improved since a number of times or scanning precision of the partial region may be improved during a limited amount of time.

Although the present disclosure has been described with reference to the exemplary embodiment of the present disclosure, those of ordinary skill in the art should understand that the present disclosure may be modified and changed in various ways within the scope not departing from the spirit and area of the present disclosure described in the claims below.

The invention claimed is:

1. A device for extracting depth information, the device comprising:
   a light output unit configured to output infrared (IR) light;
   a light adjustment unit configured to adjust the angle of the light output from the light output unit such that the light scans a first region including an object and then adjusts the angle of the light such that the light scans a second region, which is a portion of the first region;
   a light input unit into which the light output from the light output unit and reflected from the object is input; and
   a control unit configured to extract depth information of the second region using a flight time of the light that is output from the light output unit, scans, is reflected from the second region, and is input into the light input,
   wherein the first region is an entire region including a first portion of the object, and the second region is extracted from the first region and is a partial region that is a predetermined partial region of the first portion of the object,
   wherein the light adjustment unit is set to scan the second region for the same amount of time as the amount of time taken to scan the first region,
   wherein the light adjustment unit includes a microelectromechanical system (MEMS) actuator configured to adjust the angle of light, and
   wherein an operating cycle of the MEMS actuator for scanning the second region is set to be the same as an operating cycle of the MEMS actuator for scanning the first region.

2. The device of claim 1, wherein:
   the light input unit includes a plurality of pixels each including a first reception unit and a second reception unit; and
   the control unit calculates the flight time using a difference between amounts of light input into the first reception unit and the second reception unit.

3. The device of claim 2, wherein the first reception unit is activated while a light source is turned on, and the second reception unit is activated while the light source is turned off.

4. The device according to claim 2, wherein the first region is scanned in a first frame and the second region is scanned in remaining frames.

5. The device according to claim 2, wherein the second region is a region required for controlling an application.

6. The device of claim 1, wherein the control unit includes:
   a timing control unit configured to control a time point of at least one of the light output unit, the light adjustment unit, and the light input unit;
   a conversion unit configured to convert an electrical signal input through the light input unit into a digital signal; and
   a signal processing unit configured to extract depth information of the second region.

7. The device according to claim 1, wherein the first region is scanned in a first frame and the second region is scanned in remaining frames.

8. The device according to claim 1, wherein the second region is a region required for controlling an application.

9. A device for extracting depth information, the device comprising:
   a light output unit configured to output infrared (IR) light;
   a light adjustment unit configured to adjust the angle of the light output from the light output unit such that the light scans a first region including a first portion of an object and then adjusts the angle of the light such that the light scans a second region, which is a portion of the first region and includes a predetermined partial region of the first portion of the object;
   a light input unit into which the light output from the light output unit and reflected from the object is input; and
   a control unit configured to extract depth information of the second region using a flight time of the light that is output from the light output unit, scans, is reflected from the second region, and is input into the light input,
   wherein the first region is an entire region including the object, and the second region is extracted from the first region and is a partial region including a predetermined region of the object, and
   wherein the light adjustment unit is set to scan the second region for the same amount of time as the amount of time taken to scan the first region.

10. A method for extracting depth information of a device for extracting depth information, the method comprising:
    scanning a first region including an object with infrared (IR) light output from a light output unit;
    receiving a light that scans the first region and is reflected from the first region;
    scanning a second region, which is a portion of the first region, with IR light output from the light output unit;
    receiving a light that scans the second region and is reflected from the second region; and
    extracting depth information of the second region using a flight time of the light that is output from the light output unit, scans, is reflected from the second region, and is input into the light input unit,
    wherein the first region is an entire region including a first portion of the object, and the second region is extracted from the first region and is a partial region that is a predetermined partial region of the first portion of the object,
    wherein the light adjustment unit is set to scan the second region for the same amount of time as the amount of time taken to scan the first region, wherein the light adjustment unit includes a microelectromechanical system (MEMS) actuator configured to adjust the angle of light, and wherein an operating cycle of the MEMS actuator for scanning the second region is set to be the same as an operating cycle of the MEMS actuator for scanning the first region.

11. The method according to claim 10, wherein the first region is scanned in a first frame and the second region is scanned in remaining frames.

12. The method according to claim 10, wherein the second region is a region required for controlling an application.

* * * * *